United States Patent
Hasegawa et al.

(10) Patent No.: US 10,242,707 B1
(45) Date of Patent: Mar. 26, 2019

(54) TIMING INDEX WRITES TO A TAPE MEDIUM

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Sosuke Matsui, Tokyo (JP); Shinsuke Mitsuma, Machida (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/007,074

(22) Filed: Jun. 13, 2018

(51) Int. Cl.
  *G11B 20/12* (2006.01)
  *G11B 20/10* (2006.01)
  *G11B 5/008* (2006.01)

(52) U.S. Cl.
  CPC .... *G11B 20/10222* (2013.01); *G11B 5/00813* (2013.01)

(58) Field of Classification Search
  CPC ......... G11B 20/16; G11B 20/12; G11B 15/46; G11B 27/032; G11B 27/107; G06F 17/30182; G06F 17/30091; G06F 17/30321; G06F 11/1458; G06F 11/1469; G06F 3/0682; G06F 2212/213
  See application file for complete search history.

(56) References Cited

U.S. PATENT DOCUMENTS

| | | | |
|---|---|---|---|
| 6,192,376 B1 * | 2/2001 | Kincaid | G06F 11/1435 707/696 |
| 2008/0071805 A1 | 3/2008 | Mourra et al. | |
| 2015/0161161 A1 | 6/2015 | Iwanaga et al. | |
| 2016/0329079 A1 | 11/2016 | Abe et al. | |

* cited by examiner

*Primary Examiner* — Nabil Z Hindi
(74) *Attorney, Agent, or Firm* — James L. Olsen (57) ABSTRACT

Aspects of the present disclosure relate to a method for timing index write to a tape medium of a tape system. Index write timing data that specifies index write timing based on file metadata attributes is stored. Metadata attributes of a first file are analyzed to determine whether a first index should be written at a first time based on the index write timing data. In response to determining that an index should be written, the first index is written to the tape medium at the first time.

20 Claims, 6 Drawing Sheets

TIMING INDEX WRITES TO A TAPE MEDIUM

BACKGROUND

The present disclosure relates generally to the field of storage systems in computing environments, and more particularly to writing data in a tape file system.

Magnetic tape systems store digital information on a magnetic tape. The magnetic tape can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to timing index writes to a tape medium of a tape system. Index write timing data that specifies index write timing based on file metadata attributes can be stored. Metadata attributes of a first file can be analyzed to determine whether a first index should be written at a first time based on the index write timing data. In response to determining that an index should be written, the first index can be written to the tape medium at the first time.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of storage systems in computing environments, and more particularly to writing data in a tape file system. While the present disclosure is not necessarily limited to such applications, various aspects of the disclosure may be appreciated through a discussion of various examples using this context.

The Linear Tape File System (LTFS) is a file system that allows access to files stored on a tape medium in a similar fashion to files stored on a disk (e.g., Hard Disk Drive (HDD)) or flash memory (e.g., a NAND Storage USB Memory Device). The LTFS enables data access (e.g., read/write access) to a file stored on the tape medium directly from a file-based application without using a dedicated application for the tape drive. The LTFS is formatted in accordance with an open specification defined by the International Organization for Standardization (ISO). The ISO defined LTFS format specification includes two partitions: an index partition (IP) and a data partition (DP). The index partition records indices (e.g., metadata or index information) for respective files and the data partition records the files as well as indices.

The index partition is updated with the most recent index information to reduce the amount of time required to read index information when the tape medium is mounted into a tape drive. Upon remounting the tape medium, the index information is read from the index partition (e.g., located at the beginning of the tape medium), and the most recent data written to the tape medium can be located on the tape medium. In contrast, the index information can also be read directly from the data partition, though the mounting process can take more time, as the index stored on the data partition is located at the end of the data portion of the tape.

If index information is not written to the tape, errors can occur. For example, if the LTFS is currently writing a specific file, "File Z," to the tape medium, and the system loses power prior to writing an index corresponding to "File Z," "File Z" becomes inaccessible. This is because the LTFS depends on the index information to locate each respective file stored on the tape drive.

Index information is currently updated to the index partition and/or data partition based on three conditions:
 a. Each time a file is closed
 b. When the tape is unmounted
 c. Periodically (e.g., every 5 minutes)

Regarding condition "a," each time a file is closed an index corresponding to the file can automatically be written. This limits the amount of data lost during failure (e.g., a power outage) to only the opened file (e.g., the file currently being written) at most. However, when a large number of files are written, an index will be written for each file, and consequently a large number of indices will be stored. This reduces the amount of space on the tape used for actual data storage. Accordingly, by updating indices according to condition "a," effective utilization of the tape medium storage capacity can be reduced if a large number of files are written.

Regarding condition "b," in response to an unmount operation, an index corresponding to all the files (e.g., one or more) written prior to unmounting is stored on the tape medium (e.g., in the IP and DP of the tape). However, if a failure occurs at any time while writing to the tape, all data will be lost for that session.

With reference to condition "c," an index is written periodically (e.g., every five minutes). This limits the amount of data lost during failure to the last periodic index write at most. Based on the aforementioned, condition "c" is typically selected as the default operation, as condition "c" does not lead to situations in which an unnecessary amount of indices are written (e.g., as in option "a") while simultaneously limiting the data loss during failure to the last periodic update (e.g., rather than an entire session as in option "b").

Though updating (e.g., writing, storing, etc.) indices periodically can be beneficial to updating indices at file close or based on an unmount operation, there are still observable drawbacks. There are at least two situations in which periodic updating of indices can be problematic. The first situation occurs when an index is written while a file is currently open (e.g., the periodic index write operation occurs when the file is currently being written). For example, there are certain files, such as compressible files (e.g., .zip files), that are meaningless (e.g., the data cannot be utilized) until the file is closed. In these situations, writing an index while a compressible file (e.g., or other file) is currently open is not desired, as accessing half of the file is not productive. The second situation occurs when a plurality of files are required to be closed prior to writing an index. For example, video files (e.g., surveillance video camera data) can include a plurality of image frame files followed by a ".toc" file (content file). In this instance, writing the index prior to the closing of the .toc file is not desired, as the video cannot be reproduced without the .toc file. In these situations, writing the index upon the closing of the .toc file is desired, rather than periodically writing the index.

Embodiments of the present disclosure are directed to a method of writing indices based on file metadata attributes. Index write timing data specifying the timing of index writes can be stored (e.g., in a computer system or memory located in the LFTS). Metadata attributes of a file can be analyzed based on the index write timing data to determine whether an index write is required/permitted. Based on the metadata analysis, timing index writes can be completed (e.g., while files are open or closed).

The aforementioned technology facilitates index write timing on a file by file basis (e.g., based on file metadata). For example, if writing an index (e.g., periodically) while a file having a particular file format (e.g., .zip) is open is not desired, the index write timing data can include rules preventing index writes while those files are open. Index write timing can be specified based on any suitable metadata attribute. In some embodiments, tags or indicators (e.g., particular sequences of characters and/or integers) included in metadata can be used to dictate index write timing. Aspects of the present disclosure can be configured to operate while periodic index writes are activated (e.g., condition "c" is active). For example, the metadata attributes of each individual file can specify (e.g., based on the index write timing data) whether or not periodic index writes are permitted while respective files are open. Further, aspects of the present disclosure can be configured to dictate index writes upon file closures. Metadata attributes of each individual file can specify (e.g., based on the index write timing data) whether or not index writes are required upon file closures.

Figure 1:
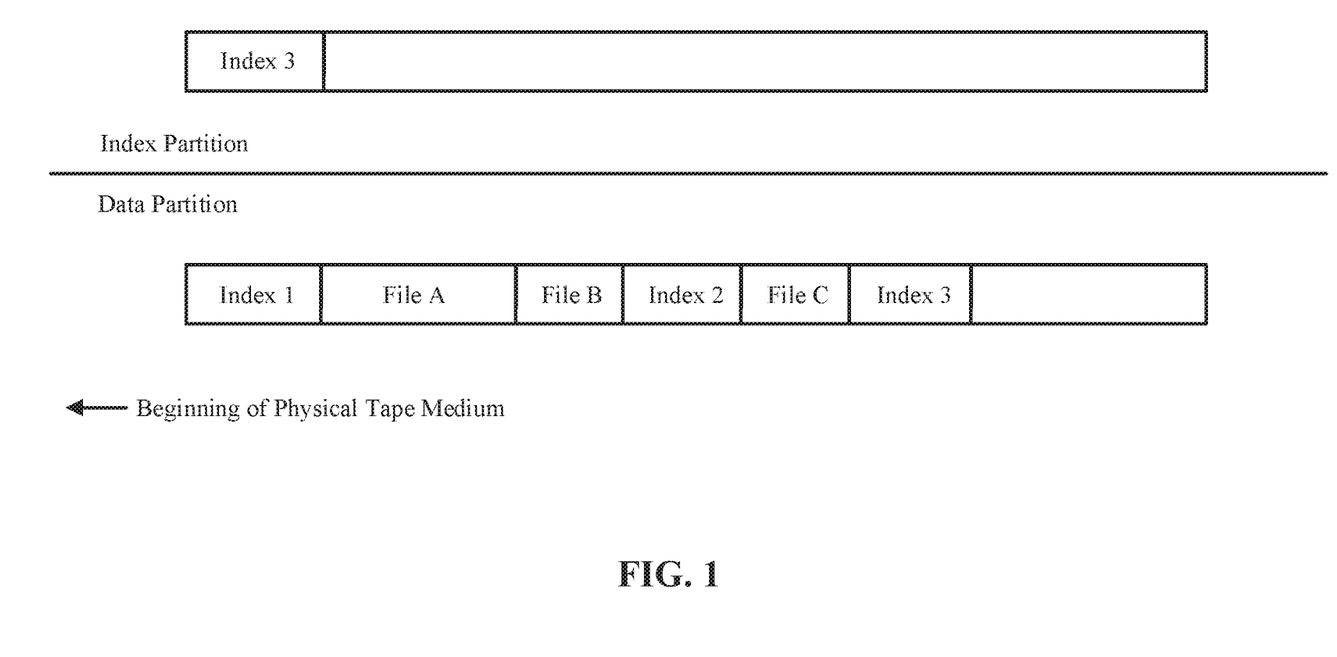
FIG. 1 is a diagram illustrating an example tape medium format including an index partition (IP) and data partition (DP), in accordance with embodiments of the present disclosure.

Referring now to the figures, FIG. 1 is a diagram illustrating an example tape medium format including an index partition (IP) and data partition (DP), in accordance with embodiments of the present disclosure. As illustrated in FIG. 1, the DP stores Index 1, File A, File B, Index 2, File C, and Index 3 in an order from the beginning of the physical tape medium to the end of the physical tape medium. The IP of the tape medium stores Index 3.

The indices (e.g., Index 1, Index 2, and Index 3) include information regarding the current volume of the data written to the tape medium. The indices can be used to verify the consistency of the tape medium volume. The index data can be stored in XML (Extensible Markup Language) format. Each index can contain a generation number, self-pointer, and back-pointer. The generation number records the age of each respective index relative to other indices in the volume. Accordingly, the index with the highest generation number represents the current state of the entire volume on the tape medium. The self-pointer includes data regarding the block position of each respective index in addition to the volume to which each index belongs. The back-pointer includes information regarding the position of the preceding index in the data partition. Accordingly, the information stored in each index can be used to locate indices, files, and blocks of data recorded on the tape medium.

In the embodiment depicted in FIG. 1, Index 1 is initially written, Index 2 is written after Files A and B are closed, and Index 3 is written after File C is closed. In accordance with conventional LFTS, the indices can be written based on any suitable condition. For example, in some embodiments, the indices can be written periodically (e.g., every 5 minutes). In some embodiments, the indices can be written each file close (e.g., Index 2 and Index 3 are written in response to closing Files B and C, respectively). In some embodiments, the indices can be written in response to the tape medium being unmounted (e.g., each index depicted in FIG. 1 is written in response to an unmount operation). However, in some embodiments, combinations of the conventional index write conditions can be implemented. For example, Index 1 can be written based on a periodic index write, Index 2 can be written based on File B being closed, and Index 3 can be written in response to an unmount operation.

The most recent index, Index 3, is stored in the IP of the tape medium such that upon remounting the tape, Index 3 can be quickly located within the IP. This improves the remounting process (e.g., the tape being reeled to the latest position in the DP) within the tape system. In some embodiments, each index (e.g., Index 1, Index 2, and Index 3) is stored in the IP, and additional indices are appended onto the end of the IP. In some embodiments, the indices stored in index partition can be rewritten with the most recent index information.

In accordance with embodiments, indices can be written based on file metadata attributes (e.g., file names, file paths, or file formats associated with each file) as opposed to, or in addition to, writing indices periodically, based on file closures, and/or based on unmounting operations. The metadata can indicate whether indices are to be written upon file closures and/or whether index writes are permitted while particular files are open. For example, tags (e.g., strings) can be included in each files' metadata which indicate whether an index should be written upon closing each respective file. In some embodiments, determining whether to write indices is based on file formats (e.g., .txt, .pdf, .toc, .exe, .mp3, .gif, .jpg, .htm, etc.). For example, indices can be automatically written for .toc (table of content) file closures, while writing indices can be automatically bypassed for .jpeg file closures.

In embodiments, writing indices based on file metadata can be completed in combination with periodic index writes.

Accordingly, file metadata attributes can dictate whether periodic index write operations are permitted for specific files. In embodiments in which indices are written based on file metadata and periodic index write triggers, file metadata may not only specify whether indices are to be written upon file closures, but may additionally specify whether periodic index writes are permitted while particular files are open.

To specify index write timing based on metadata, index write timing data can be stored (e.g., in the LTFS or in a computer system communicatively coupled to the LTFS) and referenced with respect to metadata in files. The index write timing data can dictate index write timing with respect to particular metadata attributes (e.g., sequences of characters and/or integers in file names, file paths, and/or file formats). For example, the index write timing data may dictate four different index write timings for four respective strings "OPENPROCEED," "OPENAVOID," "CLOSEPROCEED," and "CLOSEAVOID". In response to identifying "OPENPROCEED" in a file's metadata (e.g., in the file name or file path), a determination can be made to allow index writes (e.g., periodic index writes) while the file is currently being written (e.g., the file is currently open). In response to identifying "OPENAVOID" in a file's metadata, a determination can be made to block index writes while the file is currently being written. In response to identifying "CLOSEPROCEED" in a file's metadata, a determination can be made to write an index after closing the respective file. In response to identifying "CLOSEAVOID" in a file's metadata, a determination can be made to not write an index after closing the respective file.

As further discussed herein, write conditions will be referenced with respect to the aforementioned strings (e.g., OPENPROCEED corresponds to an index write timing condition for allowing periodic index writes while files are open). Though index write timing conditions will be referenced with respect to the aforementioned strings, it is noted that the strings are not required to trigger any of the aforementioned index write timing conditions.

Though reference is made to an example where index write timing data dictates index write timing based on particular character sequences (e.g., strings), in embodiments, index write timing data can dictate index write timing based on any other file metadata attribute. For example, in some embodiments, identification of integers in file metadata can be used to trigger different index write timings (e.g., identification of "1" leads to a determination to allow index writes while a file is currently open, identification of "2" leads to a determination to not allow index writes while a file is currently open, etc.). In some embodiments, index write timing data can dictate index write timing based on particular file formats (e.g., .txt, .pdf, .toc, .exe, .mp3, .gif, .jpg, .htm, .dat, etc.). In these embodiments, sets of index write timing rules can correspond to each file format. For example, if a file format for a file being written to the tape medium is a .txt, a determination can be made to allow periodic index writes while .txt files are open (e.g., OPENPROCEED) and write indices after .txt files are closed (e.g., CLOSEPROCEED). The index write timing data can store a table having a plurality of index write timing rules for particular file formats.

As an example, the index write timing data can include index write timing rules with respect to various file formats, as depicted in Table 1.

TABLE 1

| File Format | OPENPROCEED | OPENAVOID | CLOSEPROCEED | CLOSEAVOID |
|---|---|---|---|---|
| .txt | Y | N | Y | N |
| .pdf | Y | N | Y | N |
| .jpeg | N | Y | N | Y |
| .zip | N | Y | N | Y |
| .toc | N | Y | Y | N |
| .exe | Y | N | Y | N |
| .dat | N | Y | N | Y |

When a file is opened (e.g., a write is initiated) on the tape medium, the file can be analyzed (e.g., by a computer system or the LTFS) to determine the file format of the file. Based on the determined file format, the index write timing data of Table 1 can be referenced to determine the index write timing. For example, if a write is initiated for a .pdf file, a determination can be made that periodic index writes are permitted while the .pdf file is open and that, upon closing the .pdf file, an index is to be written.

Reference will now be made to an example for timing index writes based on the index write timing data of Table 1 for a block of video data comprised of .jpeg files and a .toc file. Storing the video data can initiate by writing a series of .jpeg images files for each video frame (e.g., in a Motion JPEG (M-JPEG) format) to the tape medium. If a periodic index write operation occurs while any of the .jpeg files are being written, based on the index write timing data of Table 1, a determination can be made to block the periodic index write. This can be completed because .jpeg format files are compressed, which can render any partition of the data meaningless if an index is written while the .jpeg file is open. Further, upon closing any .jpeg file, a determination can be made to not write an index. This can be completed because the video cannot be reproduced without the entirety of .jpeg files. Upon completing the writing of the video data, a .toc file (table of contents file) is written. According to the index write timing data of Table 1, if a periodic index write occurs while the .toc file is open, a determination will be made to block (e.g., not write) the index. Upon closing the .toc file, a determination is made to write an index. Writing an index after closing the .toc file is executed because the .toc completes the block of video data. Accordingly, the index written to the tape medium corresponds to the entire block of video data, rather than a partition of the video data.

Figure 2:
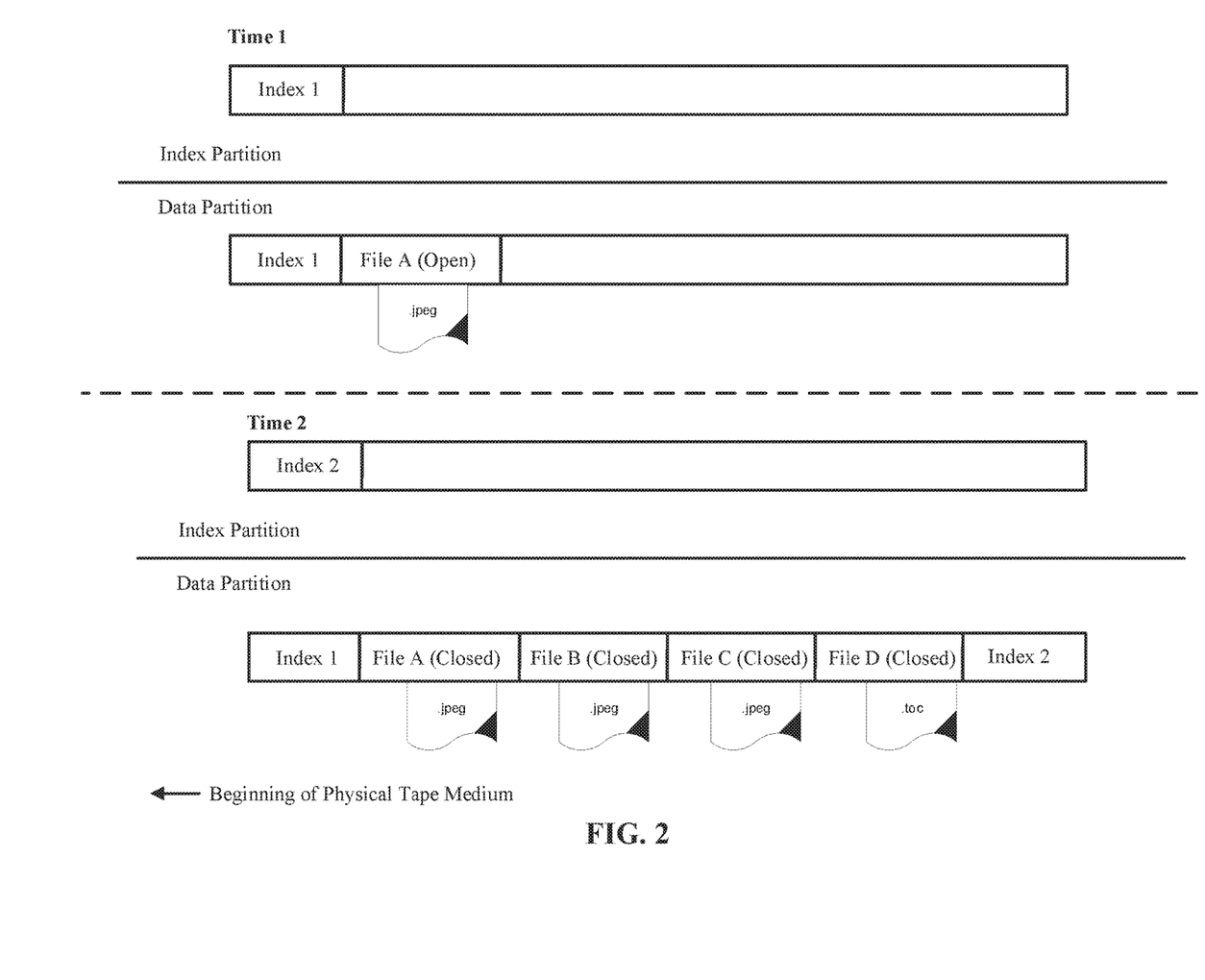
FIG. 2 is a diagram illustrating an example of timing index writes according to file format metadata attributes, in accordance with embodiments of the present disclosure.

FIG. 2 is a diagram illustrating an example of timing index writes according to file format metadata attributes, in accordance with embodiments of the present disclosure. In this embodiment, index write timing data specifies index write timing conditions according to Table 1 discussed above. At Time 1, File A is open and being written. Because File A is a .jpeg file, if a periodic index write operation occurs, the index write will not be permitted based on the index write timing conditions specified in Table 1.

At Time 2, additional .jpeg files, File B and File C, are closed. Indices are not written upon closing any of the .jpeg files according to the index write conditions specified in Table 1. However, Index 2 is written upon closing File D according to the index write timing rules specified in Table 1. Further, if a periodic index write operation is received while File D is open, the write operation will be blocked as specified in the index write timing rules.

Figure 3:
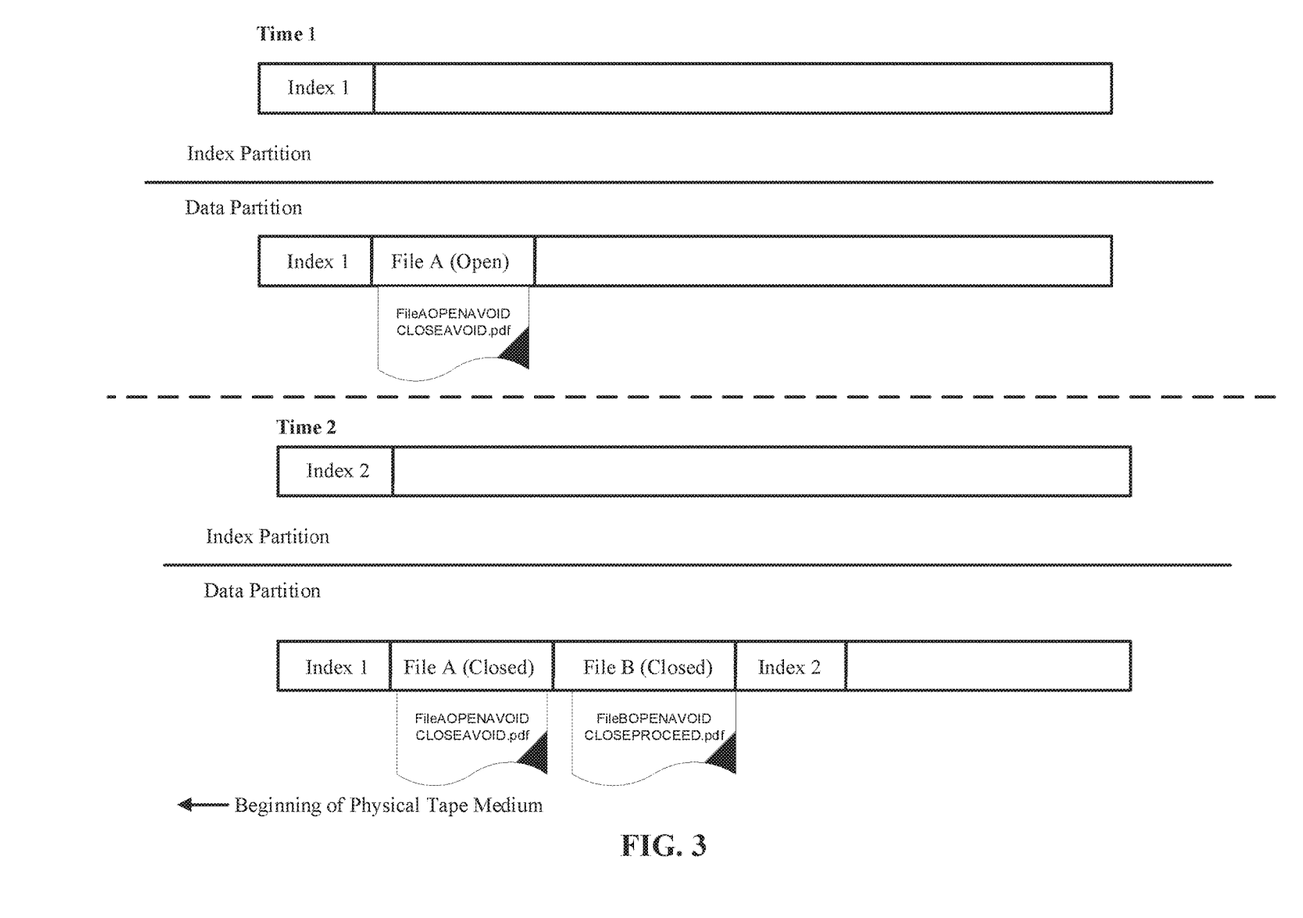
FIG. 3 is a diagram illustrating an example of timing index writes according to file name metadata attributes, in accordance with embodiments of the present disclosure.

FIG. 3 is a block diagram illustrating an example of timing index writes according to file name metadata attributes, in accordance with embodiments of the present disclosure. At Time 1, File A is currently opened and being written. Index write timing data specifies index write timing conditions for particular strings present in files metadata (e.g., the file name). In this instance, File A's file name includes two strings that specify two index write timing conditions. The first string, "OPENAVOID," specified in the file name indicates that, if a periodic index write operation is triggered while File A is open, the index write will not be permitted (e.g., will be blocked). The second string, "CLOSEAVOID," specified in the file name indicates that, upon closing File A, an index will not be written. Accordingly, if a periodic index update is triggered while File A is open (e.g., the 5 minute period for writing the index lapses), a determination can be made that an index write is not permitted while File A is currently open based on the index write timing data (e.g., the identification of the string "OPENAVOID" leads to a determination to block the periodic index update). Further, upon closing File A, a determination can be made not to write an index based on the index write timing data (e.g., the identification of the string "CLOSEAVOID" leads to a determination to not store an index after closing File A).

At Time 2, Index 2 is written after File B is closed. File B's file name also includes two strings specifying two index write timing conditions. The first string, "OPENAVOID," specified in File B's file name indicates that, if a periodic index write operation is triggered while File B is open, the index write will not be permitted. The second string, "CLOSEPROCEED," specified in the file name indicates that, upon closing File B, an index will be written. Accordingly, if the periodic index update is triggered while File B is being written, a determination can be made not to write the index. Further, upon closing File B, a determination can be made to write Index 2 based on the File B's file name.

Based on comparison of the characters present in the file names to the index write timing data (at the time corresponding to File B's closure, Time 2), a determination is made to store Index 2 to the Data Partition of the tape medium.

Figure 4:
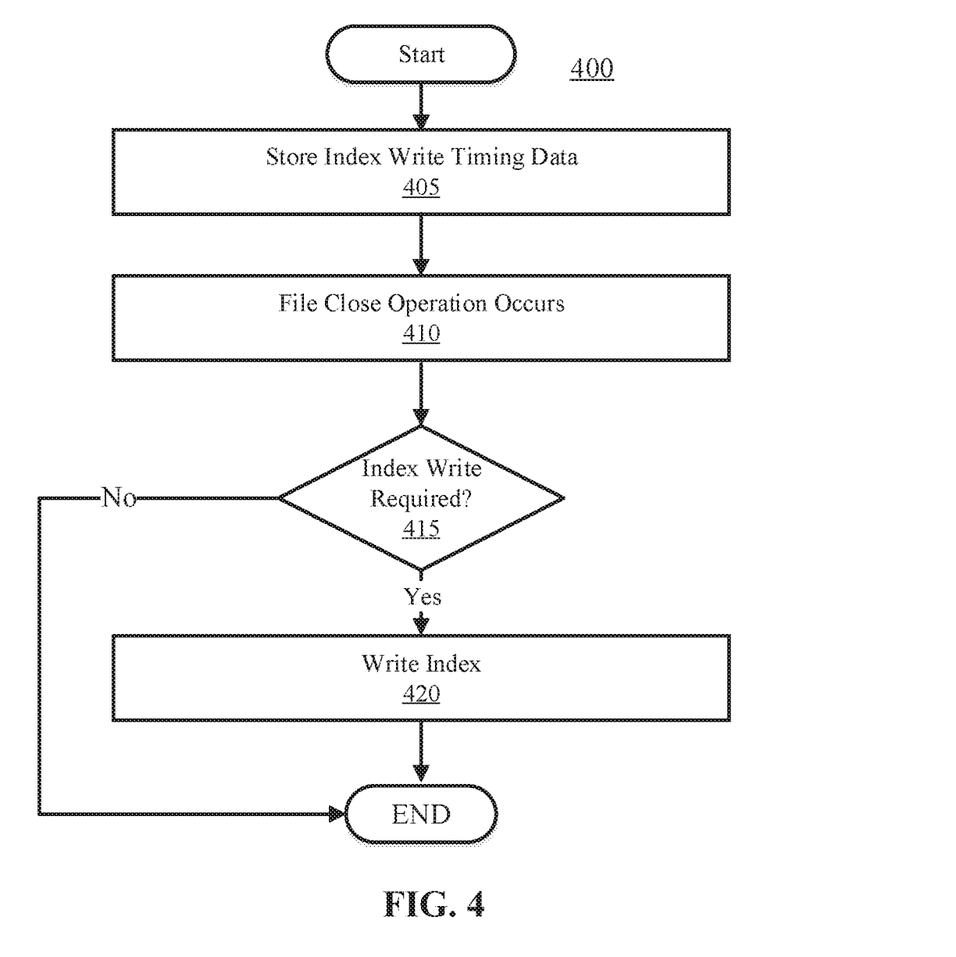
FIG. 4 is a flow diagram illustrating an example method for writing an index based on file metadata attributes at a time corresponding to a file closure, in accordance with embodiments of the present disclosure.

Referring now to FIG. 4, shown is a flow diagram illustrating an example method 400 for writing indices based on file metadata attributes at a time corresponding to a file closure, in accordance with embodiments of the present disclosure. As referenced in FIG. 4, the index partition, data partition, files, and indices can be the same as or substantially similar to the index partition, data partition, files, and indices described in FIGS. 1-3.

Method 400 initiates at step 405, where index write timing data (e.g., data dictating the timing for index writing) is stored. In some embodiments, the index write timing data is stored in a configuration file. The configuration file can be referenced while writing data to and/or reading data from the tape system. In some embodiments, the index write timing data is stored on memory located in the tape system (e.g., the LTFS). For example, index write timing data can be stored in Cartridge Memory (CM), MAM (Media Auxiliary Memory), or non-volatile memory located in the tape system. In some embodiments, the index write timing data is stored in memory on a computer system communicatively coupled to the tape system. The index write timing data can specify when indices are to be written based on file metadata attributes. For example, the index write timing data can specify index write timing based on file metadata attributes such as characters and/or integers located in file names, characters and/or integers located in file paths, and file format identifiers. File metadata attributes used to determine index write timing include, but are not limited to, file headers, magic numbers, operating system (OS) codes, PRONOM unique identifiers (PUIDs), file format identifiers (FFIDs), file content based format identifiers, and the like.

In some embodiments, the index write timing data can specify index timings based on tags (e.g., indicators, strings, numerical indicators, etc.) located in file metadata. For example, a tag "OP" (e.g., corresponding to "OPENPROCEED") located in file metadata may indicate that an index should be written while a particular file is open, and a tag "OA" (e.g., corresponding to "OPENAVIOD") located in file metadata may indicate that an index should not be written while the particular file is open. Similarly, tags can specify index write timing upon file closure. For example, a tag "CP" (e.g., corresponding to "CLOSEPROCEED") located in file metadata may indicate that an index can be written when a particular file is closed, and a tag "CA" (e.g., corresponding to "CLOSEAVOID") located in file metadata may indicate that an index should not be written when a particular file is closed. Accordingly, if a periodic index write operation issues while a file is open, if the file's metadata includes the tag "OA," the periodic index write will not occur (e.g., will be blocked), as the metadata specifies that an index is not to be written. Similarly, if a file is currently being closed and the tag "CA" is located in the file's metadata, an index write operation will not occur upon closing the file.

In some embodiments, index write timing data can specify index write timings based on file formats. Particular file formats (.pdf, .txt, .toc, .zip, .jpeg, .doc, etc.) can be linked to index write timing conditions (e.g., "PROCEED," "AVOID"). For example, the index write timing data can indicate that indices are never to be written while .zip files are open, but indices are to be written upon closing .zip files. As another example, index write timing data can indicate that indices can be written while .pdf files are open and additionally that indices are to be written each time pdf files are closed.

A file close operation occurs. This is illustrated at step 410. All of the relevant data associated with the closed file may be successfully written, and accordingly the file is closed such that a subsequent file or index can be written. In response to the file close operation, a determination is made whether an index write is required. This is illustrated at step 415. Determining whether an index write is required upon the file closure is completed by analyzing the file's metadata based on the index write timing data. For example, if the index write timing data includes a set of strings which trigger various different index write timings, the file's metadata can be parsed for those particular strings. In particular, a string corresponding to a condition for writing indices upon file closures can be identified in order to determine whether an index write is required (e.g., the file can be parsed for a string such as "CLOSEPROCEED," which indicates an index is to be written upon file closure). Similarly, a string corresponding to a condition for not writing indices upon file closure can be identified (e.g., by parsing the metadata) in order to determine whether an index write is not required (e.g., the file can be parsed for a string such as "CLOSEAVOID").

As another example, if file format rules (e.g., such as in Table 1) are specified, the file's metadata can be analyzed (e.g., parsed) to determine the format of the particular file. In response to determining the file's metadata, the identified format can be compared to the index write timing data in order to determine the appropriate index write timing conditions for the file. For example, for a file currently being closed, a computer system or the LTFS can parse the file to determine the file format of the file. The file format can then be referenced in the index write timing data in order to determine whether an index write is required upon closing the file (e.g., based on index timing rules, such as those specified in Table 1). Though reference is made to parsing file "tags" and file formats, any other suitable file metadata attribute (e.g., file headers, magic numbers, OS codes, PUIDs, FFIDs, etc.) can be analyzed and compared to the index write timing data in order to determine index write timing.

If a determination is made that an index write is required at step 415, the index is written upon the file closure. This is illustrated at 420. In some embodiments, the index is only written to the data partition of the tape medium after the file. However, in some embodiments, the index is written to both the data partition and index partition of the tape medium. After an index is written at step 420, method 400 ends. If a determination is made that an index write is not required at step 415, the file close operation is completed without writing an index, and method 400 ends. Upon file closure, addition data can be written to the tape medium.

Figure 5:
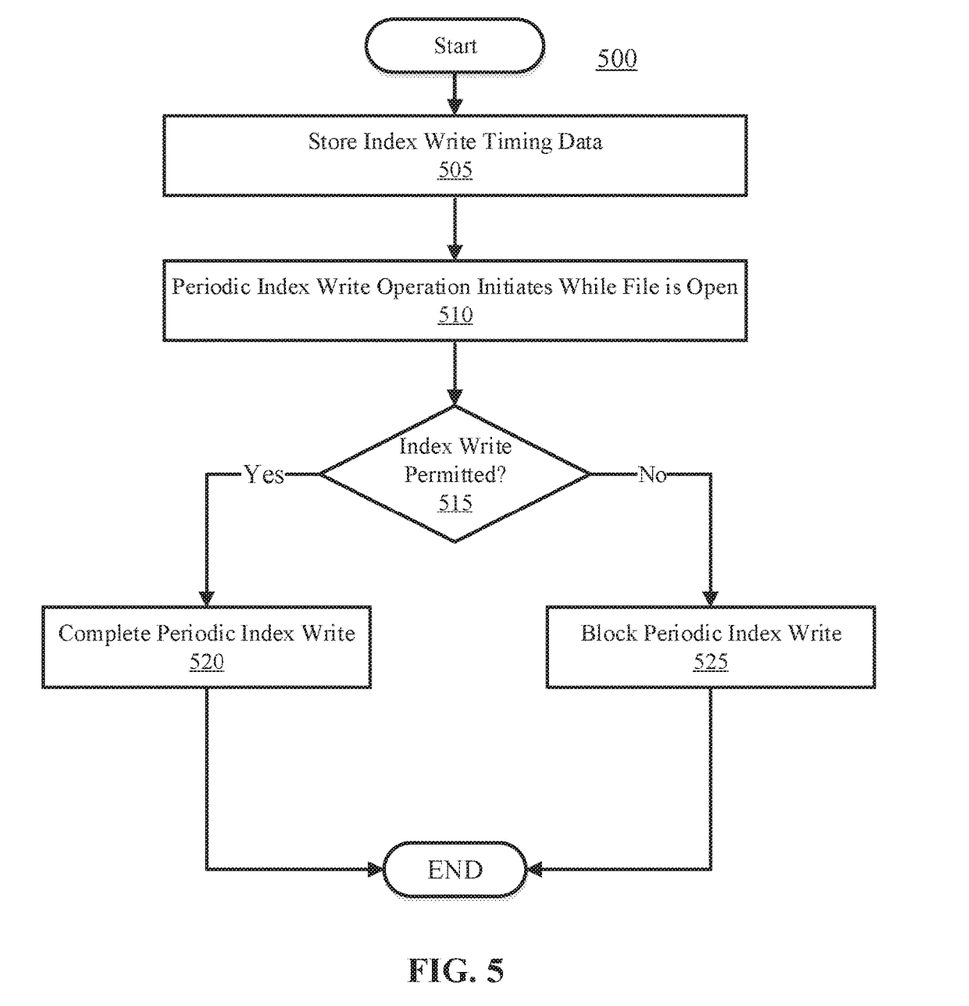
FIG. 5 is a flow diagram illustrating an example method for permitting or blocking a periodic index write while a file is currently open, in accordance with embodiments of the present disclosure.

Referring now to FIG. 5, shown is a block-diagram illustrating an example method 500 for permitting or blocking a periodic index write while a file is currently open (e.g., being written), in accordance with embodiments of the present disclosure. As referenced in FIG. 5, the index partition, data partition, files, and indices can be the same as, or substantially similar to, the index partition, data partition, files, and/or indices referenced in FIGS. 1-4.

Method 500 initiates where index write timing data is stored. This is illustrated at step 505. The index write timing data can be the same as, or substantially similar to, the index write timing data described in FIGS. 1-4. The index write timing data can be stored in a manner similar to step 405 of FIG. 4. The index write timing data specifies index write timing based on metadata attributes.

A periodic index write operation initiates while a file is open. This is illustrated at step 510. Periodic index write operations are index write operations that occur repeatedly at predetermined time intervals. For example, in the LTFS, periodic write operations occur every 5 minutes. However, in embodiments, periodic writes can occur on any time interval (e.g., every 30 seconds, every minute, every hour, every 12 hours, etc.). Because periodic index write operations occur uniformly at predetermined time intervals, in many instances they can occur while files are currently being written (as in step 510).

In response to the periodic index write operation initiation, a determination is made whether an index write is permitted while the file is open. This is illustrated at step 515. Determining whether an index write is permitted is completed by analyzing the open file's metadata based on the index write timing data. Analyzing the file's metadata based on the index write timing data can be completed in a similar to manner to step 415 depicted in FIG. 4. However, rather than determining whether a write is required upon file closure, a determination is made whether a periodic index write is permitted while a file is open (e.g., the open file can be parsed for "OPENPROCEED" or "OPENAVOID" to determine whether the periodic write is permitted.

If the index write timing data specifies that an index write is not permitted (e.g., the file format prohibits periodic index writes while the file is open or the file metadata includes a tag that indicates periodic index writes are not permitted while the file is open), method 500 proceeds to step 525, where the periodic index write is blocked. Blocking the periodic index write can include overriding the periodic index write operation, intercepting the periodic index write operation, redirecting the periodic index write operation, delaying the periodic index write operation (e.g., by a predetermined amount of time), canceling the periodic index write operation, etc. After the periodic index write is blocked, method 500 ends, and the file write can be completed.

If the index write timing data specifies that an index write is permitted (e.g., the file format permits periodic index writes while the file is open or the file metadata includes a tag that indicates periodic index writes are permitted while the file is open), method 500 proceeds to step 520, where the periodic index write is completed. After the index write operation is completed, method 500 ends, and the file write can be resume (e.g., after writing the index) and be completed.

Figure 6:
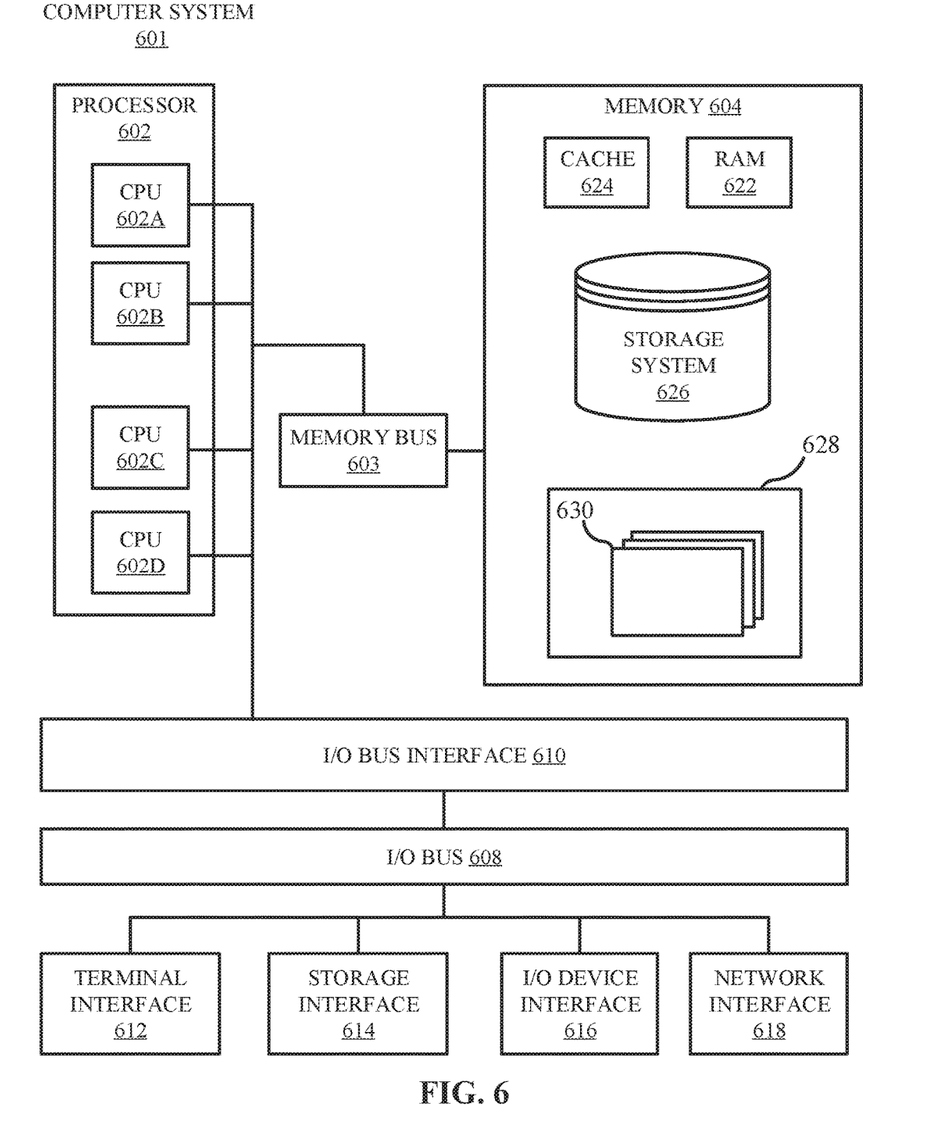
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., a computer system communicatively coupled to the linear tape file system (LTFS)) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 601 can comprise one or more CPUs 602, a memory subsystem 604, a terminal interface 612, a storage interface 616, an I/O (Input/Output) device interface 614, and a network interface 618, all of which can be communicatively coupled, directly or indirectly, for inter-component communication via a memory bus 603, an I/O bus 608, and an I/O bus interface unit 610.

The computer system 601 can contain one or more general-purpose programmable central processing units (CPUs) 602A, 602B, 602C, and 602D, herein generically referred to as the CPU 602. In some embodiments, the computer system 601 can contain multiple processors typical of a relatively large system; however, in other embodiments the computer system 601 can alternatively be a single CPU system. Each CPU 602 can execute instructions stored in the memory subsystem 604 and can include one or more levels of on-board cache.

System memory 604 can include computer system readable media in the form of volatile memory, such as random access memory (RAM) 622 or cache memory 624. Computer system 601 can further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. In embodiments, memory 604 can include a magnetic tape system. For example, the computer system 601 may be communicatively coupled to a linear tape file system (LTFS). Memory devices can be connected to memory bus 603 by one or more data media interfaces. The memory 604 can include at least one program product having a set (e.g., at least one) of program modules that are configured to carry out the functions of various embodiments.

One or more programs/utilities 628, each having at least one set of program modules 630 can be stored in memory 604. The programs/utilities 628 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 628 and/or program modules 630 generally perform the functions or methodologies of various embodiments.

In some embodiments, the program modules 630 of the computer system 601 can include an index write timing module. The index write timing module can include a data store for storing index write timing data. The index write timing data can specify index write timing rules based on file metadata attributes. In embodiments, the index write timing module is configured to determine the timing to write indices to a tape medium based on file metadata. For example, the index write timing module can analyze (e.g., parse) metadata for a file currently being written, and determine whether an index write is permitted while the file is open or whether an index write is required upon closing the file based on the index write timing data (e.g., by comparing the parsed metadata to the index write timing data).

Although the memory bus 603 is shown in FIG. 6 as a single bus structure providing a direct communication path among the CPUs 602, the memory subsystem 604, and the I/O bus interface 610, the memory bus 603 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 can, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices can be connected directly to one or more system I/O buses.

In some embodiments, the computer system 601 can be a multi-user mainframe computer system, a single-user system, or a server computer or similar device that has little or no direct user interface, but receives requests from other computer systems (clients). Further, in some embodiments, the computer system 601 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components can have greater or lesser complexity than as represented in FIG. 6, components other than or in addition to those shown in FIG. 6 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for timing index writes to a tape medium of a tape system, the method comprising:

storing index write timing data that specifies index write timing based on file metadata attributes;

analyzing metadata attributes of a first file to determine whether a first index should be written at a first time based on the index write timing data; and writing, in response to determining that the first index should be written, the first index to the tape medium at the first time.

2. The method of claim 1, wherein the index write timing data specifies that indices are required to be written upon file closure for any file having a first file attribute, wherein analyzing metadata attributes associated with the first file includes determining that the first file includes the first file attribute, wherein the first time corresponds to a time of file closure of the first file, wherein the first index is written at the first time based on the file having the first attribute.

3. The method of claim 1, further comprising:

analyzing metadata of a second file to determine that the second file is of a second file format, wherein the index write timing data specifies that indices are not to be written upon file closure for any file having the second file format;

determining whether to write a second index at a second time, wherein the second time corresponds to a time of file closure of the second file; and not writing the second index based on the second file being of the second file format and the second time being the time of file closure of the second file.

4. The method of claim 1, wherein the index write timing data specifies that indices are not to be written while any file having a first file attribute is open, wherein analyzing metadata associated with the first file includes determining that the file does not have the first file attribute, wherein the first time corresponds to a time of a periodic index write operation, wherein the first index is written at the first time based on the file not having the first file attribute.

5. The method of claim 1, further comprising:

analyzing metadata of a second file to determine that the second file has a second file attribute, wherein the index write timing data specifies that indices are permitted to be written while any file having the second file attribute is open;

determining whether to write a second index at a second time, wherein the second time corresponds to a time of a periodic index write; and writing the second index at the second time based on the second file having the second file attribute and the second time being the time of the periodic index write.

6. The method of claim 1, wherein the index write timing data is stored in a configuration file in non-volatile memory located on the tape system.

7. The method of claim 1, wherein the first index is written adjacent to the first file in a data partition of the tape medium, wherein the first index is additionally written to an index partition of the tape medium.

8. A system comprising:

a tape system having a tape medium; and a processor configured to perform a method for timing index writes to the tape medium of the tape system, the method comprising:

storing index write timing data that specifies index write timing based on file metadata attributes;

analyzing metadata attributes of a first file to determine whether a first index should be written at a first time based on the index write timing data; and writing, in response to determining that the first index should be written, the first index to the tape medium at the first time.

9. The system of claim 8, wherein the index write timing data specifies that indices are to be written upon file closure for any file having a first file attribute, wherein analyzing metadata associated with the first file includes determining that the first file includes the first file attribute, wherein the first time corresponds to a time of file closure of the first file, wherein the first index is written at the first time based on the file having the first file attribute.

10. The system of claim 8, wherein the method performed by the process further comprises:

analyzing metadata of a second file to determine that the second file is of a second file format, wherein the index write timing data specifies that indices are not to be written upon file closure for any file having the second file format;

determining whether to write a second index at a second time, wherein the second time corresponds to a time of file closure of the second file; and not writing the second index at the second time based on the second file being of the second file format and the second time being the time of file closure of the second file.

11. The system of claim 8, wherein the index write timing data specifies that indices are not to be written while any file having a first file attribute is open, wherein analyzing metadata associated with the first file includes determining that the file does not include the first file attribute, wherein the first time corresponds to a time of a periodic index write, wherein the first index is written at the first time based on the first file not including the first file attribute.

12. The system of claim 8, wherein the method performed by the processor further comprises:

analyzing metadata of a second file to determine that the second file is of a second file format, wherein the index write timing data specifies that indices are permitted to be written while any file having the second file format is open;

determining whether to write a second index at a second time, wherein the second time corresponds to a time of a periodic index write; and writing the second index at the second time based on the second file being of the second file format and the second time being the time of the periodic index write.

13. The system of claim 8, wherein the index write timing data is stored in a configuration file in non-volatile memory located on a computer system including the processor.

14. The system of claim 8, wherein the first index is written adjacent to the first file in a data partition of the tape medium, wherein the first index is additionally written to an index partition of the tape medium.

15. A computer program product comprising a computer readable storage medium having program instructions embodied therewith, the program instructions executable by a processor to cause the processor to perform a method for timing index writes to a tape medium of a tape system, the method comprising:

storing index write timing data that specifies index write timing based on file metadata attributes;

analyzing metadata attributes of a first file to determine whether a first index should be written at a first time based on the index write timing data; and writing, in response to determining that the first index should be written, the first index to the tape medium at the first time.

16. The computer program product of claim 15, wherein the index write timing data specifies that indices are required to be written upon file closure for any file having a first file attribute, wherein analyzing metadata attributes associated with the first file includes determining that the first file includes the first file attribute, wherein the first time corresponds to a time of file closure of the first file, wherein the first index is written at the first time based on the file having the first attribute.

17. The computer program product of claim 15, wherein the method performed by the processor further comprises:
analyzing metadata of a second file to determine that the second file is of a second file format, wherein the index write timing data specifies that indices are not to be written upon file closure for any file having the second file format;
determining whether to write a second index at a second time, wherein the second time corresponds to a time of file closure of the second file; and
not writing the second index based on the second file being of the second file format and the second time being the time of file closure of the second file.

18. The computer program product of claim 15, wherein the index write timing data specifies that indices are not to be written while any file having a first file attribute is open, wherein analyzing metadata associated with the first file includes determining that the file does not have the first file attribute, wherein the first time corresponds to a time of a periodic index write operation, wherein the first index is written at the first time based on the file not having the first file attribute.

19. The computer program product of claim 15, wherein the method performed by the processor further comprises:
analyzing metadata of a second file to determine that the second file has a second file attribute, wherein the index write timing data specifies that indices are permitted to be written while any file having the second file attribute is open;
determining whether to write a second index at a second time, wherein the second time corresponds to a time of a periodic index write; and
writing the second index at the second time based on the second file having the second file attribute and the second time being the time of the periodic index write.

20. The computer program product of claim 15, wherein the index write timing data is stored in a configuration file in cartridge memory located on the tape system.

\* \* \* \* \*